United States Patent
Rajauria et al.

(10) Patent No.: US 11,430,482 B1
(45) Date of Patent: Aug. 30, 2022

(54) DATA STORAGE DEVICE DETECTING NFT CONTAMINATION BY MEASURING THERMAL GRADIENT AND MAGNETIC WRITE WIDTH

(71) Applicant: Western Digital Technologies, Inc., San Jose, CA (US)

(72) Inventors: Sukumar Rajauria, San Jose, CA (US); Robert Lee Smith, San Jose, CA (US); Taiebeh Tahmasebi, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/357,030

(22) Filed: Jun. 24, 2021

(51) Int. Cl.
*G11B 5/60* (2006.01)
*G11B 21/10* (2006.01)
*G11B 5/012* (2006.01)

(52) U.S. Cl.
CPC ............ *G11B 21/106* (2013.01); *G11B 5/012* (2013.01)

(58) Field of Classification Search
None
See application file for complete search history.

(56) References Cited

U.S. PATENT DOCUMENTS

| 5,414,689 | A | * | 5/1995 | Maeda | G11B 20/10 |
| | | | | | 369/59.19 |
| 8,553,507 | B1 | | 10/2013 | Tagawa et al. | |
| 8,760,979 | B1 | * | 6/2014 | Chou | G11B 5/6088 |
| | | | | | 369/13.13 |
| 9,601,140 | B1 | | 3/2017 | Rajauria | |
| 9,704,519 | B1 | | 7/2017 | Zhu et al. | |
| 9,741,378 | B1 | | 8/2017 | Yang | |
| 11,257,525 | B1 | * | 2/2022 | Rajauria | G11B 27/36 |
| 11,276,432 | B1 | * | 3/2022 | Jubert | G11B 5/02 |
| 2019/0057717 | A1 | * | 2/2019 | Chen | G11B 5/6088 |

OTHER PUBLICATIONS

J. D. Kiely, et al., "Write-Induced Head Contamination in Heat-Assisted Magnetic Recording," in IEEE Transactions on Magnetics, vol. 53, No. 2, pp. 1-7, Feb. 2017.

* cited by examiner

*Primary Examiner* — Peter Vincent Agustin
(74) *Attorney, Agent, or Firm* — Patterson + Sheridan, LLP; Steven H. VerSteeg

(57) ABSTRACT

A data storage device is disclosed comprising a head actuated over a magnetic media, wherein the head comprises a write element, a read element, a laser, and a near field transducer. An operating thermal gradient of the magnetic media is periodically measured at an operating power setting for the laser that achieves a target magnetic write width. When a slope of the operating thermal gradient exceeds a threshold, a test thermal gradient and magnetic write width of the magnetic media is measured at multiple power settings for the laser in order to detect a contamination of the near field transducer.

20 Claims, 4 Drawing Sheets

DATA STORAGE DEVICE DETECTING NFT CONTAMINATION BY MEASURING THERMAL GRADIENT AND MAGNETIC WRITE WIDTH

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to the disk by modulating a write current in an inductive coil (write coil) to record magnetic transitions onto the disk surface in a process referred to as saturation recording. During read-back, the magnetic transitions are sensed by a read element (e.g., a magneto-resistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head.

DETAILED DESCRIPTION

Figure 1:
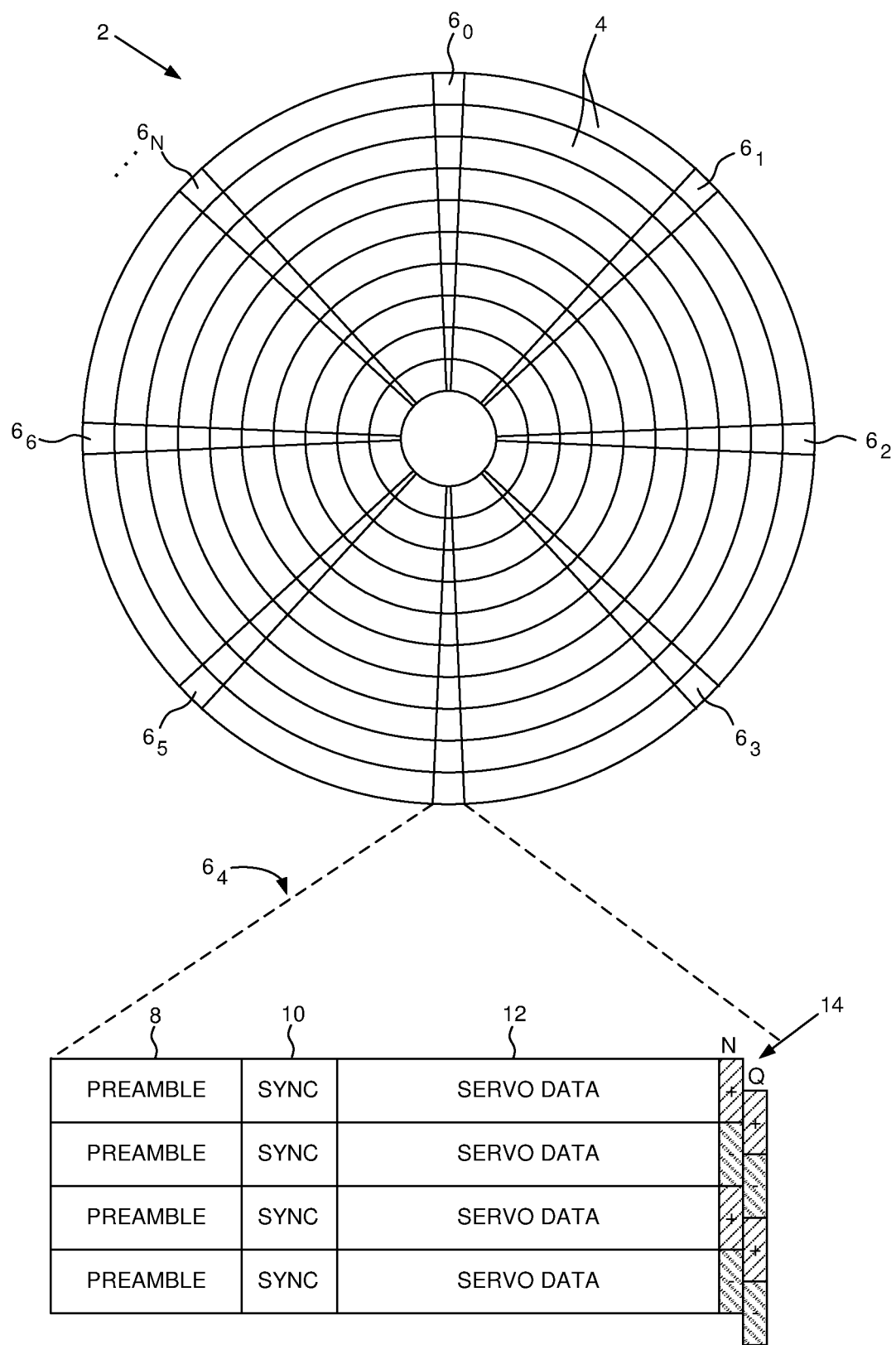
FIG. 1 shows a prior art disk format comprising a plurality of servo tracks defined by servo sectors.
Figure 2A:
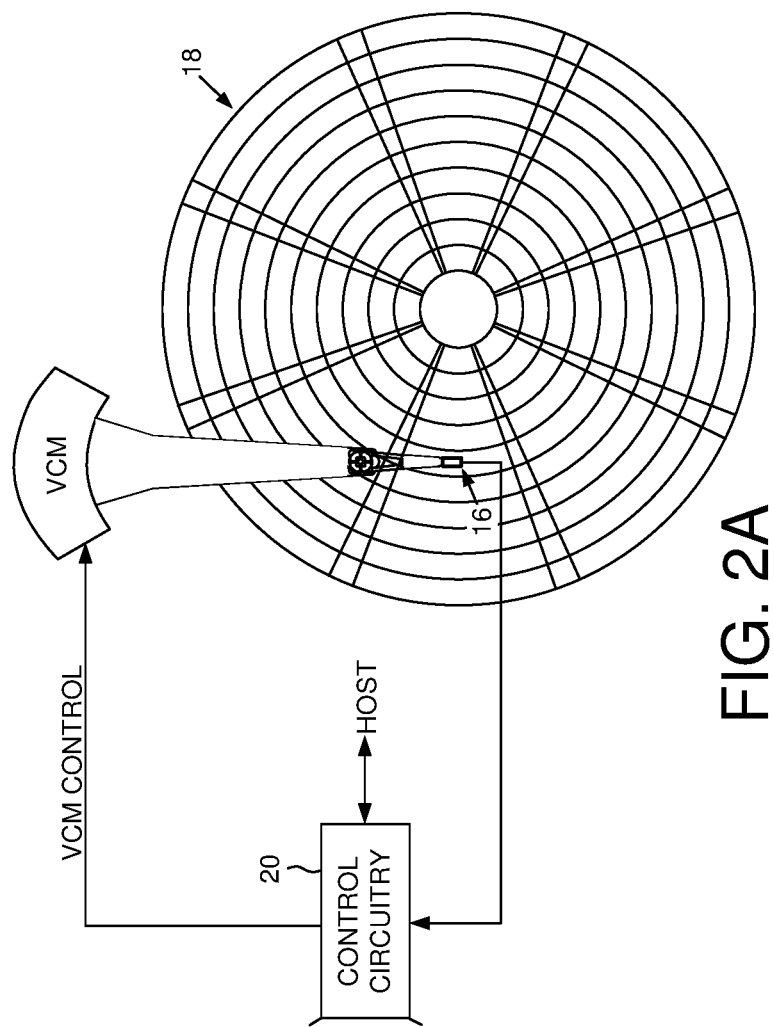
FIG. 2A shows a data storage device comprising a magnetic media in the form of a disk drive according to an embodiment comprising a head actuated over a disk.
Figure 2B:
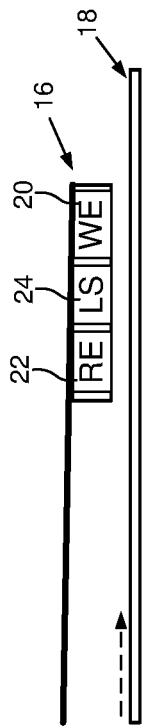
FIG. 2B shows a head according to an embodiment comprising a write element, a read element, and a laser and near field transducer (NFT) configured to heat the disk during a write operation.

FIG. 2A shows a data storage device in the form of a disk drive according to an embodiment comprising a head 16 actuated over a magnetic media in the form of a disk 18, wherein the head 16 comprises a write element 20, a read element 22, and a laser and NFT 24 (FIG. 2B). While a disk drive is used as an illustrative example herein, various embodiments of the invention may be applied to, and/or include, other types of data storage devices with energy assist magnetic media such as tape drives. The disk drive of FIG. 2A further comprises control circuitry 26 configured to execute the flow diagram of FIG. 2C wherein an operating thermal gradient of the magnetic media is periodically measured at an operating power setting for the laser that achieves a target magnetic write width (block 28). When a slope of the operating thermal gradient exceeds a threshold (block 30), a test thermal gradient and magnetic write width of the magnetic media are measured at multiple power settings for the laser (block 32) in order to detect a contamination of the near field transducer (block 34).

In one embodiment as the head 16 is flying just above the disk surface during normal operations (e.g., write operations), the head 16 may pick-up contaminate material (e.g., a metallic particle) at the air bearing surface. During a write operation, the NFT typically protrudes toward the disk surface due to thermal expansion, thereby resulting in contamination of the air bearing surface at or near the NFT. In one embodiment, this contamination of the air bearing surface can degrade the recording reliability of the head due, for example, to a thermal degradation of the NFT itself and/or due to a degradation in the efficacy of the NFT caused by changes in the head/disk interface. Accordingly in one embodiment it is desirable to detect contamination of the NFT so that any suitable remedial action may be taken, such as warning of impending failure, migrating data away from a failing disk surface, executing a burnishing procedure to burnish away the contaminate from the air bearing surface, etc.

In one embodiment, contamination of the NFT may be detected based on a change in a thermal gradient (cross-track or down-track) of the magnetic media. For example, in one embodiment during normal operation (when applying a calibrated operating power to the laser) contamination of the NFT may cause a relatively sharp increase in the operating thermal gradient such that a slope of the operating thermal gradient may exceed a threshold. However in one embodiment, other conditions may cause a sharp increase in the operating thermal gradient, such as a general degradation of the NFT over time. Accordingly in one embodiment, when a slope of the operating thermal gradient exceeds a threshold (measured at the operating laser power), a further measurement is taken in order to confirm operation of the NFT is in fact degrading due to contamination.

Figure 3:
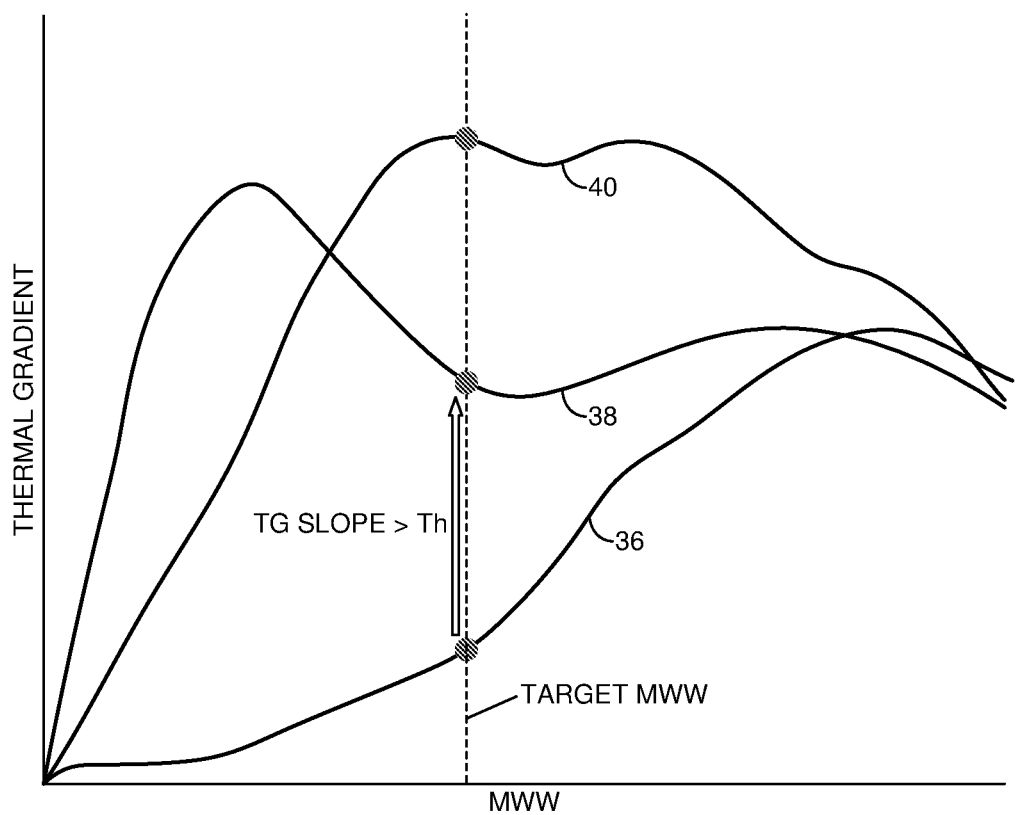
FIG. 3 shows different relationships between the thermal gradient of the magnetic media and the MWW for different sizes of contaminates affecting the NFT according to an embodiment.

FIG. 3 shows a relationship between the thermal gradient of the magnetic media and a magnetic write width (MWW) for three different levels of NFT contamination. A first plot 36 shows the relationship when the NFT is relatively free from contamination, a second plot 38 shows the relationship when the NFT is contaminated by a first size particle, and a third plot 40 shows the relationship when the NFT is contaminated by a second, larger size particle. FIG. 3 also shows a target MWW for which the operating power for the laser is calibrated (e.g., to achieve a target capacity for the magnetic media). That is during a calibration procedure, the laser power is adjusted (e.g., while writing/reading a test pattern) until the target MWW is achieved. During normal operation of the disk drive, the operating thermal gradient of the magnetic media is periodically measured at the operating laser power, and when there is a relatively sharp increase in the operating thermal gradient (i.e., when the slope of the operating thermal gradient exceeds a threshold), the sharp increase is suspected to have been caused by a contaminate affecting operation of the NFT.

In one embodiment when a slope of the operating thermal gradient exceeds a threshold, the suspected detection of NFT contamination may be confirmed by measuring a test thermal gradient and MWW of the magnetic media at multiple power settings for the laser, and then confirming contamination of the NFT when the relationship between the test thermal gradient versus the MWW substantially matches a predetermined relationship such as shown in FIG. 3. For example, in one embodiment the test thermal gradient versus MWW measurements may be curve fitted to a function, and the curve fitted function compared to a predetermined function to determine whether the test thermal gradient versus MWW substantially matches the predetermined relationship. In one embodiment, the relationship (e.g., function) of the thermal gradient versus MWW may be predetermined by evaluating a number of production disk drives (e.g., during manufacturing or while in the field) and generating the plots such as shown in FIG. 3 when the NFT is known to be contaminated (e.g., through physical inspection). In one embodiment, there may be a number of different predetermined relationships (e.g., functions) each corresponding to a different level of NFT contamination such as described above with reference to FIG. 3. In this embodiment, a suspect detection of NFT contamination based on the slope of the operating thermal gradient may be confirmed when the test thermal gradient versus MWW substantially matches any one of the predetermined relationships (i.e., any one of a number of predetermined plots or functions).

Figure 4:
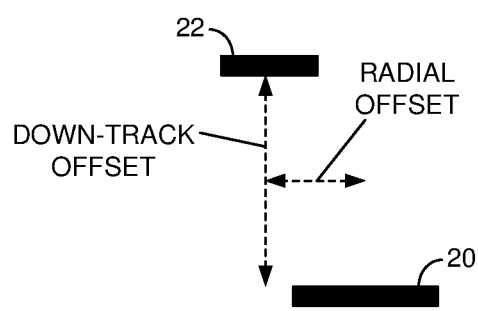
FIG. 4 shows an embodiment wherein an offset (down-track and/or radial) exists between the write element and the read element of the head.

FIG. 4 shows an embodiment wherein the write element 20 of the head 16 may be offset from the read element 22 in either or both of a down-track direction of a radial direction relative to the disk surface. In one embodiment, when the NFT is contaminated such as through material pick-up at the air bearing surface, it may manifest as a change in the offset between the write element 20 and the read element 22 (down-track and/or radial offset). For example, in one embodiment the writer/reader offset may be measured by writing/reading a test pattern to/from the magnetic media and evaluating the resulting read signal. However when a contaminant is affecting operation of the NFT it may change how the test pattern is written causing a perceived change in the writer/reader offset even though the actual physical offset has not changed. Accordingly in an embodiment shown FIG. 5A, when a slope of the operating thermal gradient exceeds a threshold (block 30) the writer/reader offset (down-track and/or radial offset) is measured (block 42) in order to detect contamination of the NFT (block 44).

Figure 2C:
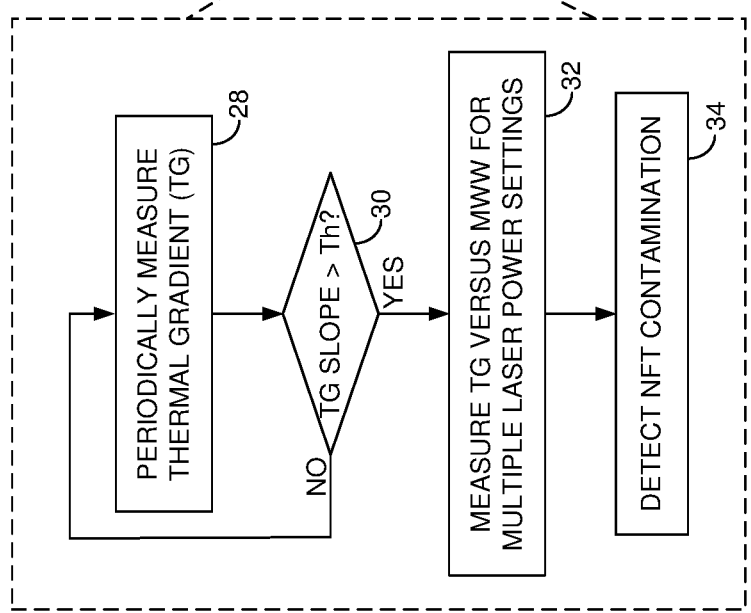
FIG. 2C is a flow diagram according to an embodiment wherein when a slope of an operating thermal gradient of the magnetic media exceeds a threshold, contamination of the NFT is detected by measuring a magnetic write width (MWW).
Figure 5A:
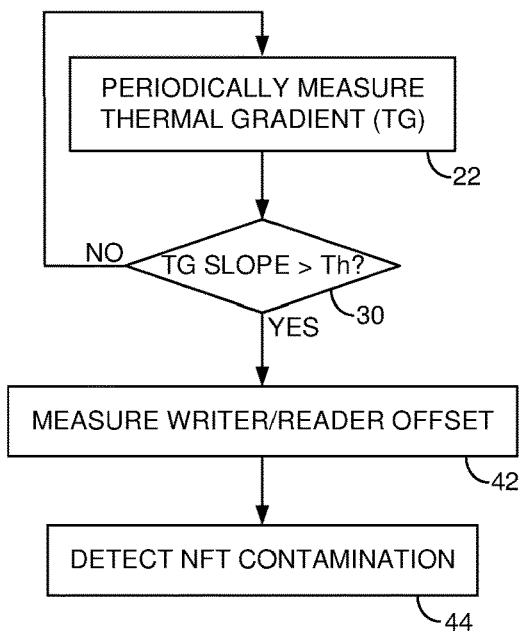
FIG. 5A is a flow diagram according to an embodiment wherein when a slope of an operating thermal gradient of the magnetic media exceeds a threshold, contamination of the NFT is detected by measuring the offset between the write element and the read element.
Figure 5B:
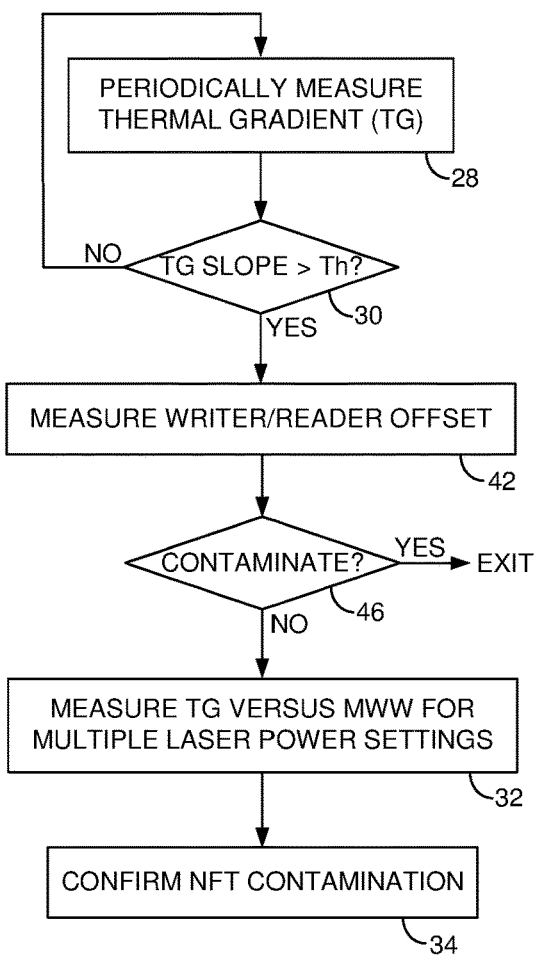
FIG. 5B is a flow diagram according to an embodiment wherein when a slope of an operating thermal gradient of the magnetic media exceeds a threshold, contamination of the NFT is detected by measuring the MWW, and a detected contamination is confirmed by measuring the offset (down-track and/or radial) between the write element and the read element of the head.

FIG. 5B is a flow diagram according to an embodiment which is a combination of the flow diagram of FIG. 2C and FIG. 5A. That is in this embodiment when the slope of the operating thermal gradient exceeds a threshold (block 30), the writer/reader offset is measured (block 42). When the writer/reader offset confirms contamination of the NFT (block 46), the flow diagram of FIG. 5B terminates without needing to measure the test thermal gradient versus MWW which may be relatively time consuming. However when the writer/reader offset does not confirm contamination of the NFT at block 46, then the more time consuming process of measuring the test thermal gradient versus MWW is performed at block 32 in order to confirm contamination of the NFT at block 34. If contamination of the NFT is not confirmed at block 34, then it assumed the slope of the operating thermal gradient exceeded the threshold at block 30 for reasons other than contamination (e.g., due to general degradation of the NFT over time).

Any suitable technique may be employed in the above described embodiments to measure the thermal gradient produced in the magnetic media by the NFT. In addition, the thermal gradient measurement may include a down-track measurement and/or a cross-track measurement. For example, in one embodiment a down-track thermal gradient may be measured by modulating the laser power during a write operation and evaluating the readback signal to measure the shift in the locations of the resulting magnetic transitions due to the modulated size of the thermal spot. In another embodiment, a cross-track thermal gradient may be measured by modulating the laser power during a write operation and measuring the modulated width of the resulting data track using any suitable technique (e.g., using a micro-track based method). In one embodiment, contamination of the NFT may be detected when the slope of either the down-track or the cross-track thermal gradient exceeds a corresponding threshold, and in another embodiment a contamination may be detected when the slope of both the down-track and the cross-track thermal gradients exceed a corresponding threshold.

Any suitable read element 22 of the head 16 may be employed in the embodiments described above, such as a suitable magnetoresistive (MR) read element, a suitable magnetic tunneling junction (MTJ) read element, etc. The head 16 may also comprise other components not shown in FIG. 2B, such as a waveguide for propagating the laser light from the laser through to the NFT and onto the surface of the magnetic media. In yet other embodiments, the head 16 may comprise a suitable fly height actuator (e.g., a thermal or piezoelectric actuator) for controlling the fly height of the head during write/read operations.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a magnetic media;
   a head actuated over the magnetic media, wherein the head comprises a write element, a read element, a laser, and a near field transducer; and
   control circuitry configured to:
   periodically measure an operating thermal gradient of the magnetic media at an operating power setting for the laser that achieves a target magnetic write width; and
   when a slope of the operating thermal gradient exceeds a threshold, measure a test thermal gradient and magnetic write width of the magnetic media at multiple power settings for the laser in order to detect a contamination of the near field transducer.

2. The data storage device as recited in claim 1, wherein the control circuitry is further configured to detect the contamination of the near field transducer when the test thermal gradient versus the magnetic write width substantially matches a predetermined relationship.

3. The data storage device as recited in claim 2, wherein the control circuitry is further configured to:
   curve fit the test thermal gradient versus magnetic write width to a function; and
   compare the curve fitted function to a predetermined function to determine whether the test thermal gradient versus the magnetic write width substantially matches the predetermined relationship.

4. The data storage device as recited in claim 2, wherein:
   the test thermal gradient versus magnetic write width exhibits a first slope when the near field transducer is substantially un-contaminated; and
   the test thermal gradient versus magnetic write width exhibits a second slope greater than the first slope when the near field transducer is contaminated.

5. The data storage device as recited in claim 2, wherein when the slope of the operating thermal gradient exceeds a threshold the control circuitry is further configured to:
   measure an offset between the write element and a read element; and
   confirm the detected contamination of the near field transducer based on the measured offset between the write element and the read element.

6. A data storage device comprising:
   a magnetic media;
   a head actuated over the magnetic media, wherein the head comprises a write element, a read element, a laser, and a near field transducer; and
   control circuitry configured to measure a test thermal gradient and magnetic write width of the magnetic media at multiple power settings for the laser in order to detect a contamination of the near field transducer.

7. The data storage device as recited in claim 6, wherein the control circuitry is further configured to:
   periodically measure an operating thermal gradient of the magnetic media at an operating power setting for the laser that achieves a target magnetic write width; and
   when a slope of the operating thermal gradient exceeds a threshold, measure the test thermal gradient and magnetic write width of the magnetic media at the multiple power settings for the laser in order to detect the contamination of the near field transducer.

8. The data storage device as recited in claim 6, wherein the control circuitry is further configured to detect the contamination of the near field transducer when the test thermal gradient versus the magnetic write width substantially matches a predetermined relationship.

9. The data storage device as recited in claim 8, wherein the control circuitry is further configured to:
curve fit the test thermal gradient and magnetic write width measurements to a function; and
compare the curve fitted function to a predetermined function to determine whether the test thermal gradient versus the magnetic write width substantially matches the predetermined relationship.

10. The data storage device as recited in claim 6, wherein:
the test thermal gradient versus magnetic write width measurements exhibits a first slope when the near field transducer is substantially un-contaminated; and
the test thermal gradient versus magnetic write width measurements exhibits a second slope greater than the first slope when the near field transducer is contaminated.

11. The data storage device as recited in claim 6, wherein the control circuitry is further configured to:
measure an offset between the write element and a read element; and
confirm the detected contamination of the near field transducer based on the measured offset between the write element and the read element.

12. A data storage device comprising:
a magnetic media;
a head actuated over the magnetic media, wherein the head comprises a write element, a read element, a laser, and a near field transducer; and
control circuitry configured to:
periodically measure an operating thermal gradient of the magnetic media at an operating power setting for the laser that achieves a target magnetic write width; and
when a slope of the operating thermal gradient exceeds a threshold, measure an offset between the write element and the read element in order to detect a contamination of the near field transducer.

13. The data storage device as recited in claim 12, wherein when the slope of the operating thermal gradient exceeds the threshold the control circuitry is further configured to:
measure a test thermal gradient and magnetic write width of the magnetic media at multiple power settings for the laser; and
confirm the detected contamination of the near field transducer based on the measured test thermal gradient and magnetic write width at the multiple power settings for the laser.

14. The data storage device as recited in claim 13, wherein the control circuitry is further configured to detect the contamination of the near field transducer when the test thermal gradient versus the magnetic write width substantially matches a predetermined relationship.

15. The data storage device as recited in claim 14, wherein the control circuitry is further configured to:
curve fit the test thermal gradient versus magnetic write width to a function; and
compare the curve fitted function to a predetermined function to determine whether the test thermal gradient versus the magnetic write width substantially matches the predetermined relationship.

16. The data storage device as recited in claim 13, wherein:
the test thermal gradient versus magnetic write width exhibits a first slope when the near field transducer is substantially un-contaminated; and
the test thermal gradient versus magnetic write width exhibits a second slope greater than the first slope when the near field transducer is contaminated.

17. A data storage device comprising:
a magnetic media;
a head actuated over the magnetic media, wherein the head comprises a write element, a read element, a laser, and a near field transducer; and
a means for measuring a test thermal gradient and magnetic write width of the magnetic media at multiple power settings for the laser in order to detect a contamination of the near field transducer.

18. The data storage device as recited in claim 17, further comprising:
a means for periodically measuring an operating thermal gradient of the magnetic media at an operating power setting for the laser that achieves a target magnetic write width; and
when a slope of the operating thermal gradient exceeds a threshold, a means for measuring the test thermal gradient and magnetic write width of the magnetic media at the multiple power settings for the laser in order to detect the contamination of the near field transducer.

19. The data storage device as recited in claim 17, further comprising a means for detecting the contamination of the near field transducer when the test thermal gradient versus the magnetic write width substantially matches a predetermined relationship.

20. The data storage device as recited in claim 17, further comprising:
a means for measuring an offset between the write element and a read element; and
a means for confirming the detected contamination of the near field transducer based on the measured offset between the write element and the read element.

* * * * *